(12) United States Patent
Mohsin et al.

(10) Patent No.: US 12,555,152 B2
(45) Date of Patent: Feb. 17, 2026

(54) METHODS AND SYSTEMS FOR USER GENERATED CONTENT INTEGRATION

(71) Applicant: Pixlee, Inc., San Francisco, CA (US)

(72) Inventors: Miraj Mohsin, New York, NY (US); Pablo Lleras, Toronto (CA); ChenFang Hsieh, New York, NY (US); Kyle M. Asaff, San Francisco, CA (US); Jeff Z. Chen, San Francisco, CA (US); Satnam S. Dhanoa, San Francisco, CA (US); Awad A. Sayeed, San Francisco, CA (US); Kyle Wong, San Francisco, CA (US); David D. Zeng, San Francisco, CA (US); Andrew M. Higgins, London (GB)

(73) Assignee: Pixlee, Inc., San Francisco, CA (US)

( * ) Notice: Subject to any disclaimer, the term of this patent is extended or adjusted under 35 U.S.C. 154(b) by 0 days.

(21) Appl. No.: 16/163,474

(22) Filed: Oct. 17, 2018

(65) Prior Publication Data

US 2020/0126142 A1    Apr. 23, 2020

(51) Int. Cl.
     *G06Q 30/0601*      (2023.01)
     *G06F 7/06*      (2006.01)
     (Continued)

(52) U.S. Cl.
     CPC .......... *G06Q 30/0631* (2013.01); *G06F 7/06* (2013.01); *G06Q 30/0282* (2013.01); *G06Q 30/0641* (2013.01); *G06Q 50/01* (2013.01)

(58) Field of Classification Search
     CPC .............. G06Q 30/0631; G06Q 50/01; G06Q 30/0282; G06Q 30/0641; G06F 16/9535; G06F 7/06; G06F 7/22
     (Continued)

(56) References Cited

U.S. PATENT DOCUMENTS

| | | | |
|---|---|---|---|
| 7,031,952 B1 * | 4/2006 | Heumann | G06N 5/022 |
| | | | 706/45 |
| 8,122,020 B1 | 2/2012 | Donsbach et al. | |

(Continued)

OTHER PUBLICATIONS

Liqiang Huang, Chuan-Hoo Tan, Weiling Ke, Kwok-Kee Wei, Do we order product review information display? How?, Information & Management, vol. 51, Issue 7, 2014, pp. 883-894 ISSN 0378-7206 (Year: 2014).*

(Continued)

*Primary Examiner* — Michael Misiaszek
(74) *Attorney, Agent, or Firm* — Fredrikson & Byron, P.A.

(57) ABSTRACT

A method, system, and non-transitory computer-readable medium provides recommendations for a product, such as for online marketing. There is a method for providing recommendations for a product that includes receiving product rating service or other textual content from various sources. The method further includes matching at least one review information from the review information associated with plural reviews of the product. Additionally, there is filtering, sorting and searching the review information associated with plural reviews based on matching and one or more rating parameters. Further, the method includes publishing the filtered review information for the product in numerous gallery tile layouts. Also, the method includes generating a display representation of the published review information on an output interface for providing recommendations for the product.

9 Claims, 13 Drawing Sheets

(51) Int. Cl.
　　*G06Q 30/0282*　　(2023.01)
　　*G06Q 50/00*　　(2024.01)
(58) Field of Classification Search
　　USPC ........................................................ 705/26.7
　　See application file for complete search history.

(56) References Cited

U.S. PATENT DOCUMENTS

| | | | |
|---|---|---|---|
| 8,209,337 B2 | 6/2012 | Park | |
| 9,569,700 B1 | 2/2017 | Santos et al. | |
| 9,846,901 B2* | 12/2017 | Boston | G06F 16/367 |
| 9,984,386 B1* | 5/2018 | Bhatia | G06Q 30/0241 |
| 10,043,137 B1 | 8/2018 | Jorgensen et al. | |
| 10,121,171 B1* | 11/2018 | Chang | G06Q 30/0643 |
| 10,171,254 B2 | 1/2019 | Davis et al. | |
| 10,185,898 B1 | 1/2019 | Folkens et al. | |
| 10,242,034 B1 | 3/2019 | Li et al. | |
| 10,248,712 B1* | 4/2019 | Cheng | G06F 16/285 |
| 10,546,352 B2 | 1/2020 | Systrom et al. | |
| 10,885,545 B1 | 1/2021 | Menendez Gonzalez et al. | |
| 10,956,948 B2* | 3/2021 | Mediratta | G06Q 30/0643 |
| 11,144,987 B2* | 10/2021 | DeLuca | G06Q 30/0282 |
| 2004/0268137 A1 | 12/2004 | Kouznetsov et al. | |
| 2009/0132526 A1 | 5/2009 | Park | |
| 2012/0062596 A1 | 3/2012 | Bedi et al. | |
| 2012/0269436 A1 | 10/2012 | Mensink et al. | |
| 2012/0303545 A1* | 11/2012 | Brondstetter | G06Q 30/00 705/347 |
| 2014/0006930 A1 | 1/2014 | Hollis et al. | |
| 2015/0100377 A1* | 4/2015 | Penumaka | G06Q 30/0201 705/7.29 |
| 2015/0264093 A1* | 9/2015 | Madisch | G06Q 10/101 715/753 |
| 2015/0281250 A1 | 10/2015 | Miller et al. | |
| 2015/0363660 A1 | 12/2015 | Vidal et al. | |
| 2016/0180438 A1* | 6/2016 | Boston | G06Q 30/0282 705/26.7 |
| 2016/0253719 A1* | 9/2016 | Akpala | G06Q 30/0282 705/347 |
| 2016/0335701 A1* | 11/2016 | Allen | G06Q 30/0631 |
| 2016/0342863 A1 | 11/2016 | Kwon et al. | |
| 2016/0343046 A1* | 11/2016 | Taguchi | G06Q 30/0282 |
| 2017/0200183 A1 | 7/2017 | Lim | |
| 2017/0262959 A1 | 9/2017 | Lee et al. | |
| 2017/0270582 A1 | 9/2017 | Forss | |
| 2017/0278135 A1 | 9/2017 | Majumdar et al. | |
| 2017/0287058 A1* | 10/2017 | Pedram | G06Q 30/0623 |
| 2018/0005526 A1 | 1/2018 | Sendhoff et al. | |
| 2018/0068031 A1 | 3/2018 | Hewavitharana et al. | |
| 2018/0137390 A1 | 5/2018 | Brundage et al. | |
| 2018/0165728 A1 | 6/2018 | McDonald et al. | |
| 2018/0182001 A1* | 6/2018 | Ghoshal | G06Q 30/0282 |
| 2018/0189857 A1 | 7/2018 | Wu et al. | |
| 2018/0260728 A1 | 9/2018 | Mathew et al. | |
| 2018/0300295 A1 | 10/2018 | Maksak et al. | |
| 2019/0005043 A1 | 1/2019 | Hemani et al. | |
| 2019/0080207 A1 | 3/2019 | Chang et al. | |
| 2020/0045374 A1 | 2/2020 | Annadurai et al. | |

OTHER PUBLICATIONS

Jing Luan, Zhong Yao, FuTao Zhao, Hao Liu, Search product and experience product online reviews: An eye-tracking study on consumers' review search behavior, Computers in Human Behavior, vol. 65, 2016, pp. 420-430 ISSN 0747-5632 (Year: 2016).*

Kim, Harry C., Authorized Officer, Commissioner for Patents, "International Search Report" in connection with related International Application No. PCT/US2019/056829, dated Nov. 25, 2019, 4 pgs.

Kim, Harry C., Authorized Officer, Commissioner for Patents, "Written Opinion of the International Searching Authority" in connection with related International Application No. PCT/US2019/056829, dated Nov. 25, 2019, 5 pgs.

* cited by examiner

FIG. 9B

METHODS AND SYSTEMS FOR USER GENERATED CONTENT INTEGRATION

INTRODUCTION

This invention relates to the field of online content generation and promotion in general, and more specifically to methods and systems for integration of user generated content used for online marketing and sales.

Users, such as consumers of retail and other products have the capability to generate large volumes of content, such as using several online channels available these days. Some of these channels include social media pages of users, products, companies and the like, blogs, dedicated webpages for product reviews and comparisons, online and brick-and-mortar advertisements, marketing materials such as marketing pages, brochures, pamphlets and the like; sales materials for different products and the like. All this content may be broadly classified as User Generated Content (hereinafter also interchangeably referred to as "UGC"). All these forms of UGC sources form a part of an increasingly possible medium of marketing and business, commonly referred to as 'social commerce'.

Along with these sources and means of marketing and business, further advancements in online social media occur at a rapid place, thus causing regular and rapid changes in the visual marketing of brands in a variety of areas. For example, to conduct efficient and effective brand management under the influence of social media on users' buying patterns, it is becoming increasingly important to manage marketing materials so that they leverage users' reviews and ratings of a product. Consumers may be more likely to trust reviews posted by friends or others online, rather than the marketing materials posted by companies themselves and claims of brand representatives. As a result, it is imperative that UGC be more actively incorporated in online marketing and content-promotion activities of companies.

A large number of social media users regularly post photos, videos, and other visual representations of the brands they use, enjoy, and trust, on online channels such as social media platforms, providing a continual source of valuable, publicly-available content. This material is not only useful for sharing experiences with 'friends' of these users, but may also be utilized by product companies and brands interested in connecting current and potential customers to real users' experiences, learning about their customer base, and addressing issues that develop in real-time, among other things.

Thus, there is a need efficiently to use social media content to process the vast quantities of social media data and UGC, and to select useful content that may not be otherwise available.

SUMMARY

The methods and systems disclosed herein provide for using the social media content, specifically the user generated content for providing reviews about various products associated with different brands.

In some example embodiments, a system for providing recommendations for a product may be provided. The system may include at least one non-transitory memory configured to store computer program code instructions and at least one processor configured to execute the computer program code instructions to: receive review information associated with a plurality of reviews from a product rating service or other textual content from various sources; match at least one review information from the review information associated with a plurality of reviews with the product; filter, sort and search the review information associated with a plurality of reviews based on matching and one or more rating parameters; publish the filtered review information for the product in numerous gallery tile layouts; and generate a display representation of the published review information on an output interface for providing recommendations for the product.

In some example embodiments, a method for providing recommendations for a product may be provided. The method may include: receiving review information associated with a plurality of reviews from a product rating service or other textual content from various sources; matching at least one review information from the review information associated with a plurality of reviews with the product; filtering, sorting and searching the review information associated with a plurality of reviews based on matching and one or more rating parameters; publishing the filtered review information for the product in numerous gallery tile layouts; and generating a display representation of the published review information on an output interface for providing recommendations for the product.

In some example embodiments, a computer program product comprising at least one non-transitory computer-readable storage medium having stored thereon computer-executable program code instructions which when executed by a computer, cause the computer to carry out operations for providing recommendations for a product, the operations comprising: receiving review information associated with a plurality of reviews from a product rating service or other textual content from various sources; matching at least one review information from the review information associated with a plurality of reviews with the product; filtering, sorting and searching the review information associated with a plurality of reviews based on matching and one or more rating parameters; publishing the filtered review information for the product in numerous gallery tile layouts; and generating a display representation of the published review information on an output interface for providing recommendations for the product.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
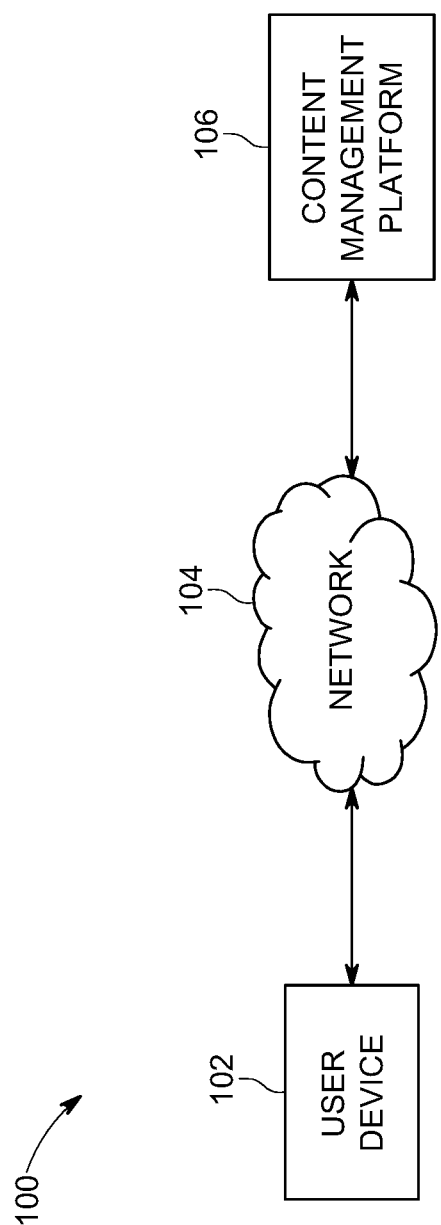
Figure 2:
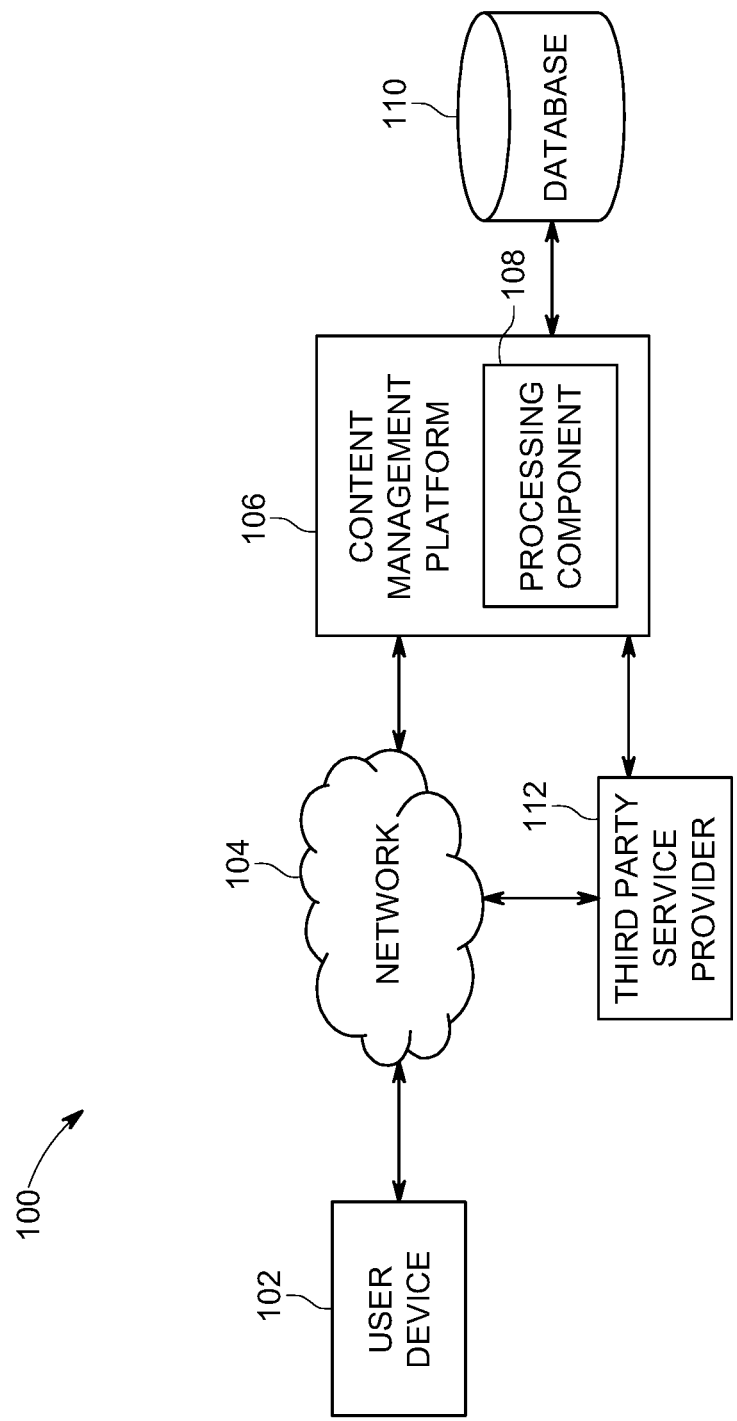
Figure 3:
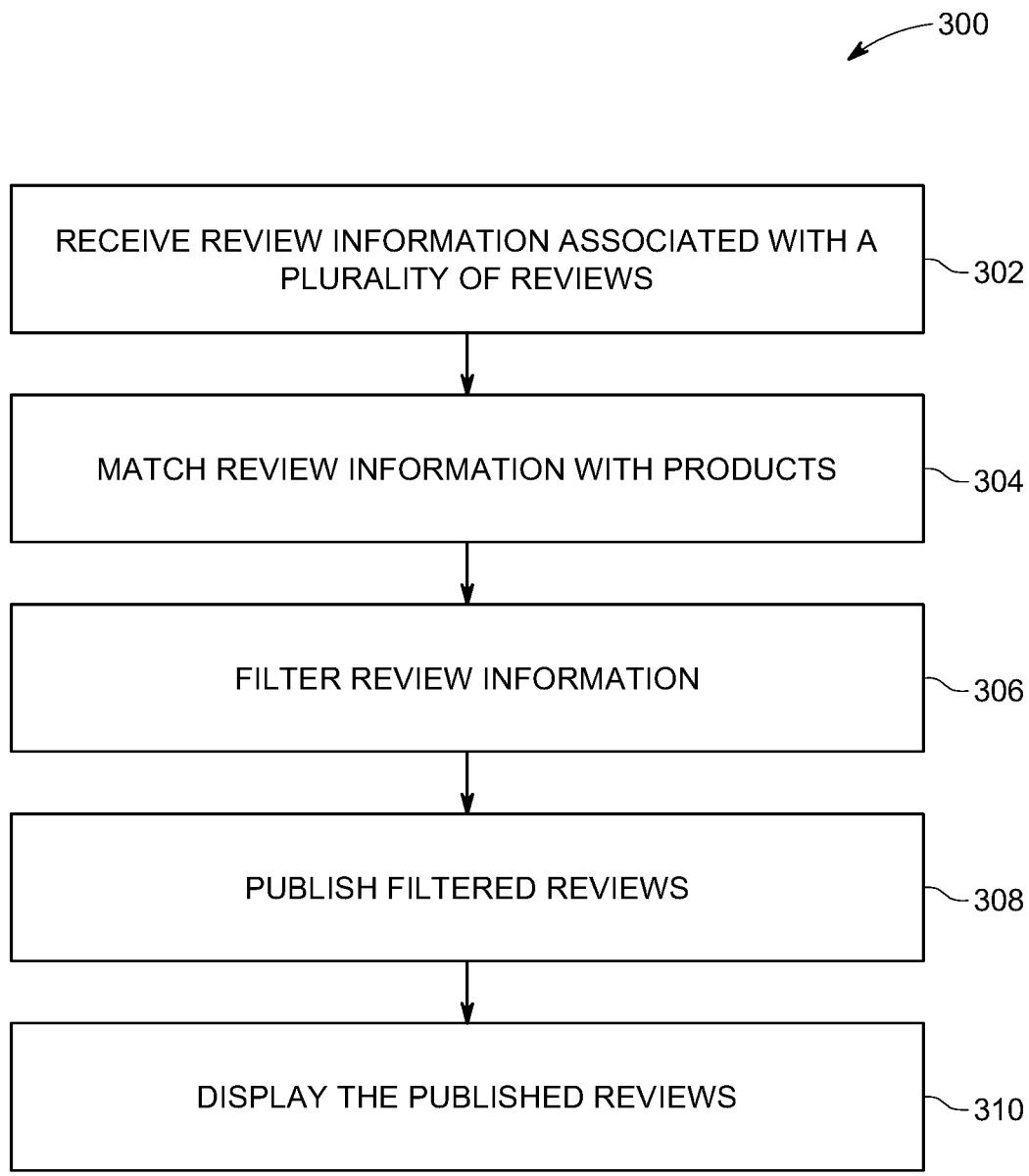
Figure 9A:
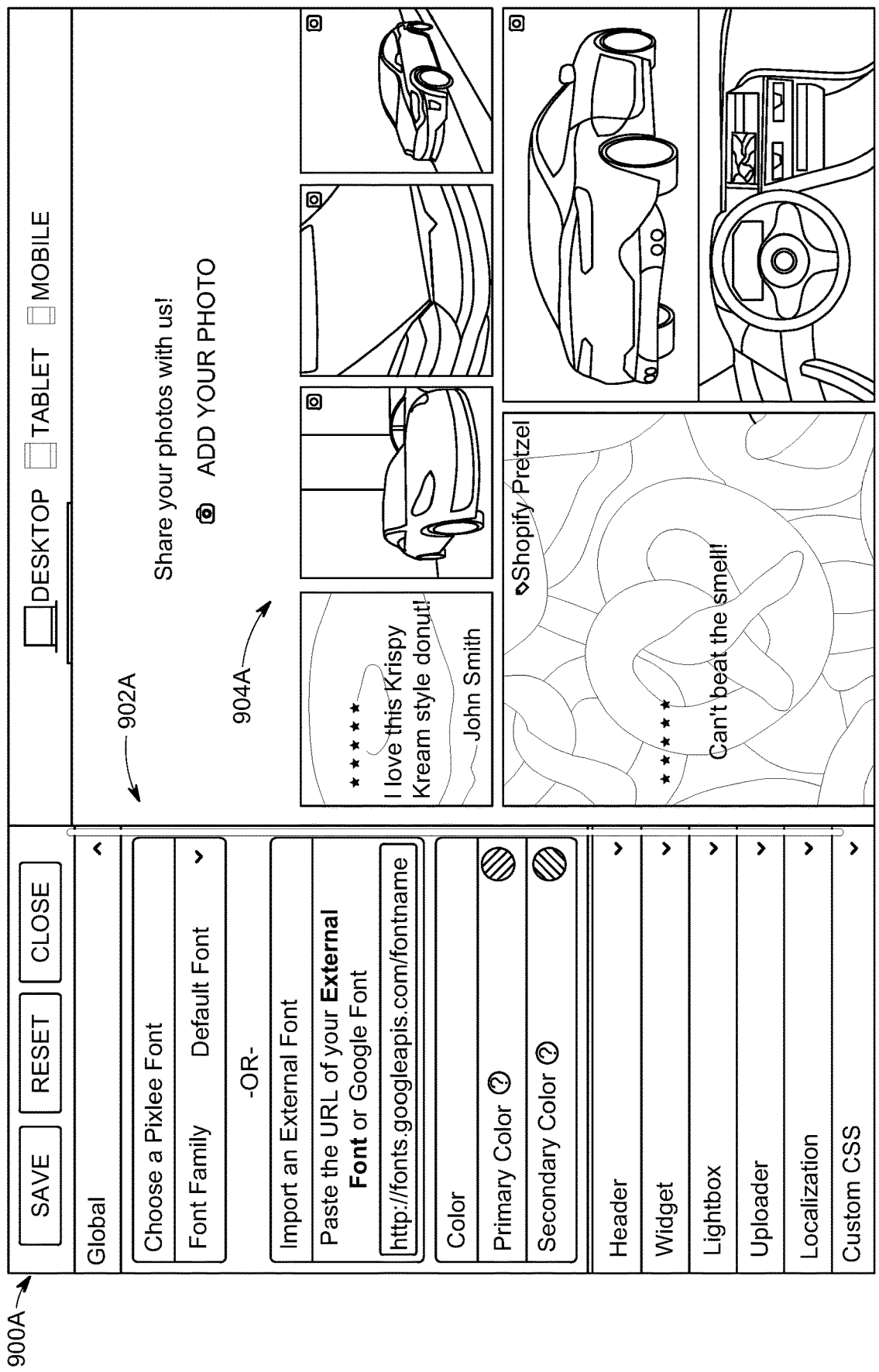
Figure 9C:
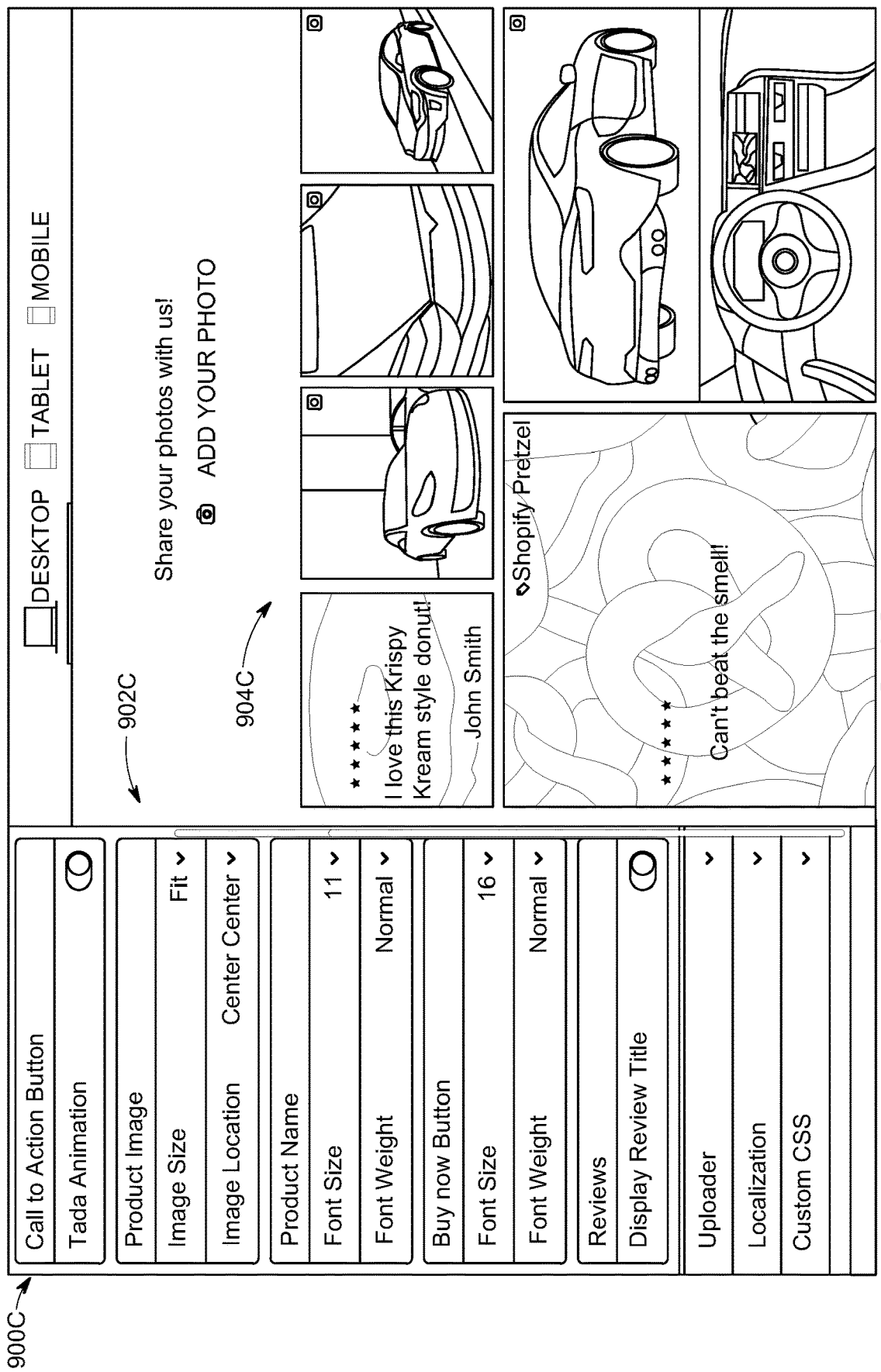
Figure 10:
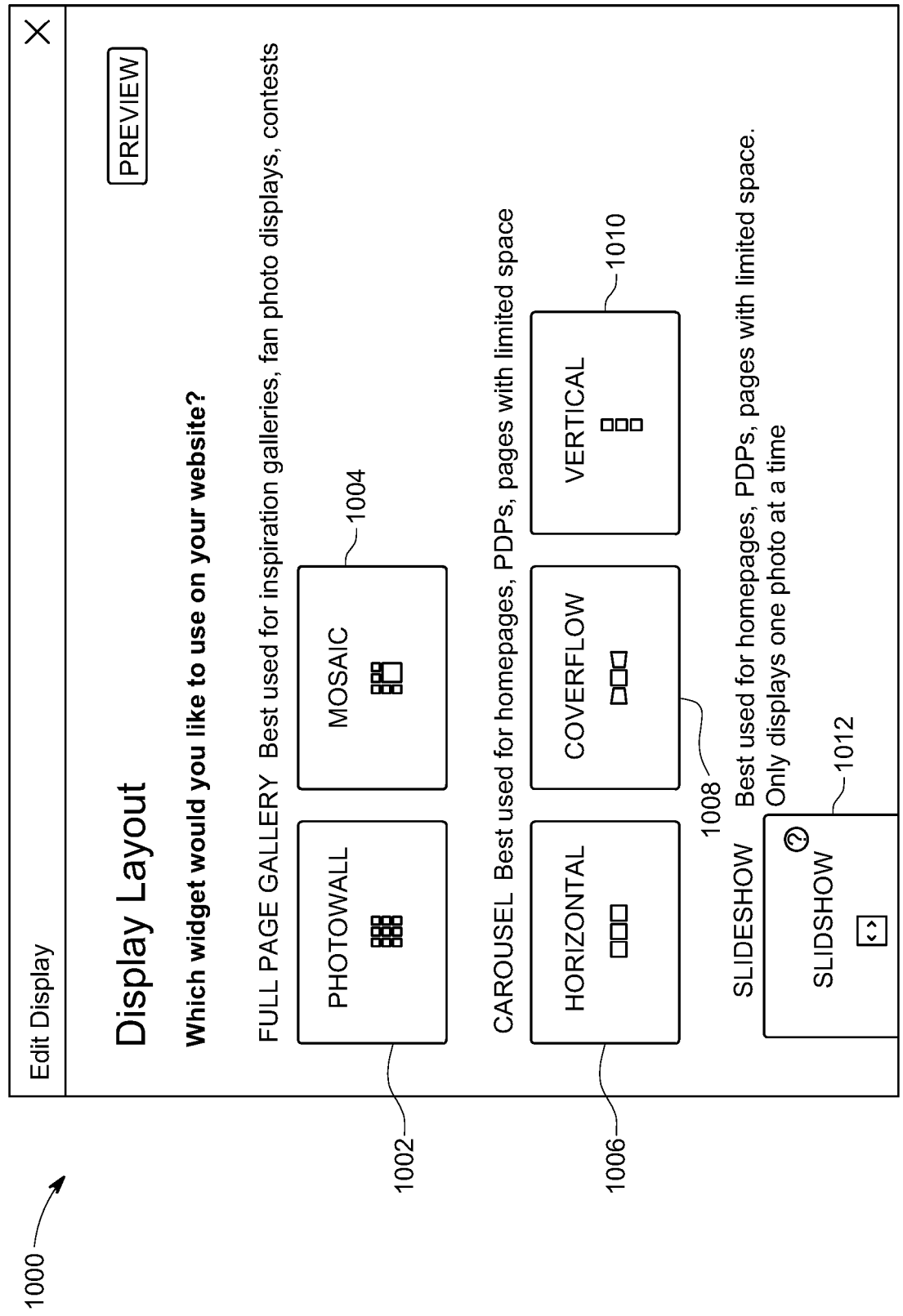
Figure 11:

Having thus described example embodiments of the invention in general terms, reference will now be made to the accompanying drawings, which are not necessarily drawn to scale, and wherein:

FIG. 1 illustrates an exemplary block diagram of a system for providing product recommendations using user generated content, in accordance with an exemplary embodiment;

FIG. 2 illustrates another exemplary embodiment of the system for providing product recommendations using user generated content, in accordance with an exemplary embodiment;

FIG. 3 illustrates an exemplary flow diagram of a method for providing product recommendations, in accordance with an exemplary embodiment;

FIGS. 4-8 illustrate display representations for providing product recommendations, in accordance with different exemplary embodiments;

Figure 9B:
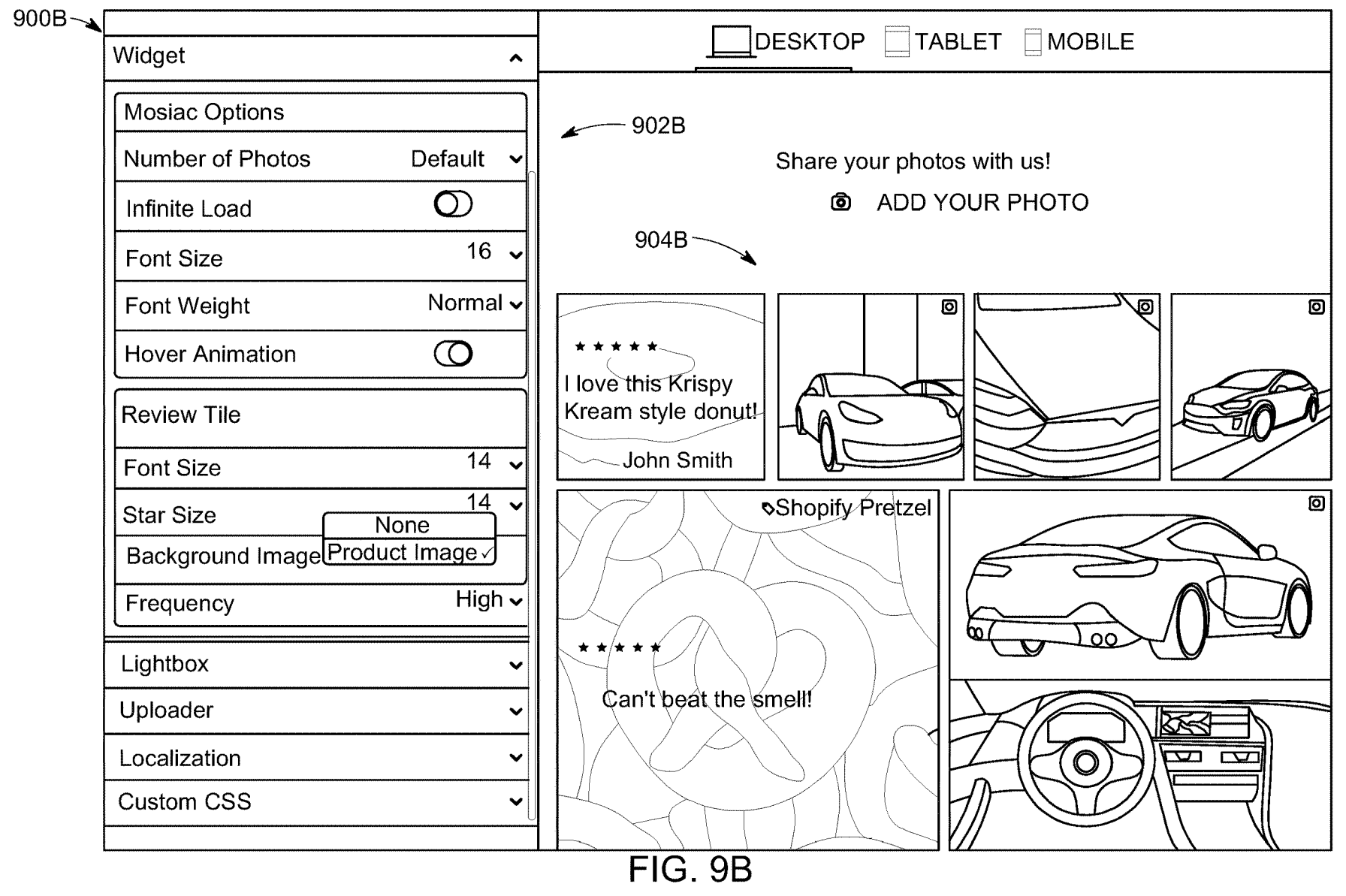

FIGS. 9A-9C illustrate exemplary user interfaces for configuring display options for a review, in accordance with different exemplary embodiments;

FIG. 10 illustrates an exemplary user interface for configuring display layout for a review, in accordance with an exemplary embodiment; and FIG. 11 illustrates an exemplary display interface of a mobile device for providing product recommendations, in accordance with an exemplary embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the process described as the object of this invention comprises a methodology used for collecting, classifying, displaying, and optimizing User Generated Content from social media platforms. There are multiple components of this process, which will be described herein. Certain embodiments of the present invention may include, but are not limited to, the following components. Certain embodiments of the present invention may additionally contain only a subset of the following components.

The methods and systems disclosed herein may provide an efficient and effective way to manage the vast amounts for UGC for product marketing, branding and promotion purposes. The various embodiments of the invention disclosed herein may provide for sorting, identifying, collecting and using UGC for online marketing and branding for various consumer related products and their associated companies (hereinafter referred to as Clients) to utilize in online and in-store advertisements, marketing materials, decorations, or a variety of other media ways more useful than various ways known in the art. Further, the methods and systems disclosed herein may allow Clients to request and receive permissions to use UGC from original content creators (hereinafter referred to as Creators), collect content into groups (hereinafter referred to as Albums), and post the chosen content on any media (website, in-store posters, etc.) having internet connectivity. Additionally, the methods and systems disclosed herein may provide for assessment of relative performance of chosen content within the Album, allowing for more informed and effective display of existing content and selection of new content by the clients.

Further, the methods and systems provided herein may provide integration of visual and textual UGC provided by a content management platform, along with a textual content obtained by a third part rating service provider. In some example embodiments, the third party rating service provider may provide an API key to access content from the content management platform. The content management platform may be configured to use this key to authenticate its request to the third party rating service provider in order to extract textual UGC content. Further, this textual content may be mixed with visual UGC visual and textual content to the users of a client's website in a variety of layouts and textual content display densities. The textual content may be related to one or more reviews of products associated with the client.

Thus, using the methods and systems disclosed herein, the user may be provided with product recommendations using both textual and visual content related to a client, such as a brand. The client may benefit from the methods and systems disclosed herein in that integration of textual and visual content may help in Increasing the client's brand value, revenue, site engagement and also consumer loyalty. Not only the clients, but the users, such as shoppers may also benefit from these methods and systems by enabling them to save time by making quicker purchase decisions due to the availability of more information about the product. The integration of visual content with text data may also facilitate in providing a better user experience while shopping on a stylish website. Overall, the methods and systems disclosed herein may provide for improving engagement of returning customers, which are highly valuable for brands that target specific customer profiles. This in turn may lead to an increase in revenue on selected types of websites such as cosmetics, clothes, equipment, fitness gear and the like.

FIG. 1 illustrates an exemplary block diagram of a system 100 for providing content for online marketing, in accordance with an exemplary embodiment of the present invention. The system 100 may include a user device 102 for enabling the user or client to access a content management platform 106 using a network 104. The content provided by the system 100 may include product recommendations for products associated with various brands.

The user device 102 may be configured to enable the user to generate, view, post, read, compare, access or share UGC related to various clients.

In some example embodiments, the user device 102 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user device 102 may enable the user to view UGC posted about a product by the content management platform 106.

The content management platform 106 may be configured to collect, organize, sort, and display content related to various products using various media sources, which may include, but are not limited to social networking platforms, user profiles on social networking platforms, online photo sharing platforms, blogging and micro-blogging websites and the like. For example, a user may post a review about a product by a specific brand, such as a bicycle, and along with a textual comment, may also post a photo of the bike on their profile page on a social networking platform. The content management platform 106, while organizing content related to the bike by this brand, may pull out user review data from the user profile and use it in providing a rating and/or a tag to the bike, for displaying on a user interface of the user device 102, such as when the user access a webpage associated with the bike on the content management platform 106. Thus, real time data posting about the bike may be captured in a dynamic manner by the content management platform 106, and further this dynamic data posting and update may be provided to the user. The user may access the content management platform 106 over a network 104.

In some example embodiments, the network 104 may be wired, wireless, or any combination of wired and wireless communication networks, such as cellular, Wi-Fi, internet, local area networks, or the like.

In some example embodiments, through the network 104, the user 102 may also be connected to some other websites, such as websites of third party service providers that may provide additional information about UGC, as will be explained in the embodiment illustrated in FIG. 2 disclosed herein.

FIG. 2 illustrates another exemplary embodiment of the system 100 for providing online marketing content, such as product recommendations, in accordance with another exemplary embodiment of the present invention. The embodiment of FIG. 2 additionally illustrates a processing component 108, that may be configured for performing one or more operations on the content managed by the content management platform 106, such as the UGC. In some example embodiments, the processing component 108 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. In some embodiments, the processing component 108 may include one or more processing cores configured to perform independently. A multi-core processor may enable multiprocessing within a single physical package. Additionally or alternatively, the processing component 108 may include one or more processors configured in tandem via the bus to enable independent execution of instructions, pipelining and/or multithreading. The various capabilities of the processing component 108 may enable the processing component 108 to perform various operations on the UGC, including, but not limited to collecting, optimizing, organizing, searching, sorting, indexing, rating, tagging, displaying, analyzing, and storing the UGC. The UGC may be stored in one or more database 110 modules associated with the content management platform 106.

In some example embodiments, the content management platform 106 may be configured to retrieve UGC from third party service provider websites 112, such as social networking websites, rating servers, blogging and micro-blogging websites, photo-sharing websites and the like. In some example embodiments, the third party service provider 112 may be a rating and review service provider service that may be configured to provide ratings and reviews related information, and other textual information associate with for various products of a brand or Company. The other type of textual information may include such as customer emails, blog content, etc. that the customer could display via the content management platform's output interface.

These may be two types of rating and review provider services: organically-created services that only serve products listed on corresponding websites; and third party product Ratings & Review services that help brands or Companies in general to collect, store, and serve product reviews. In either case, the UGC associated with a brand or product is owned by the brand itself, and the rating and review service provider may only be configured to provide collection, storage and delivery services related to the UGC and various review related data. In some example embodiments, these rating and review services may be integrated with the content management platform in an organic collaboration.

Figure 4:
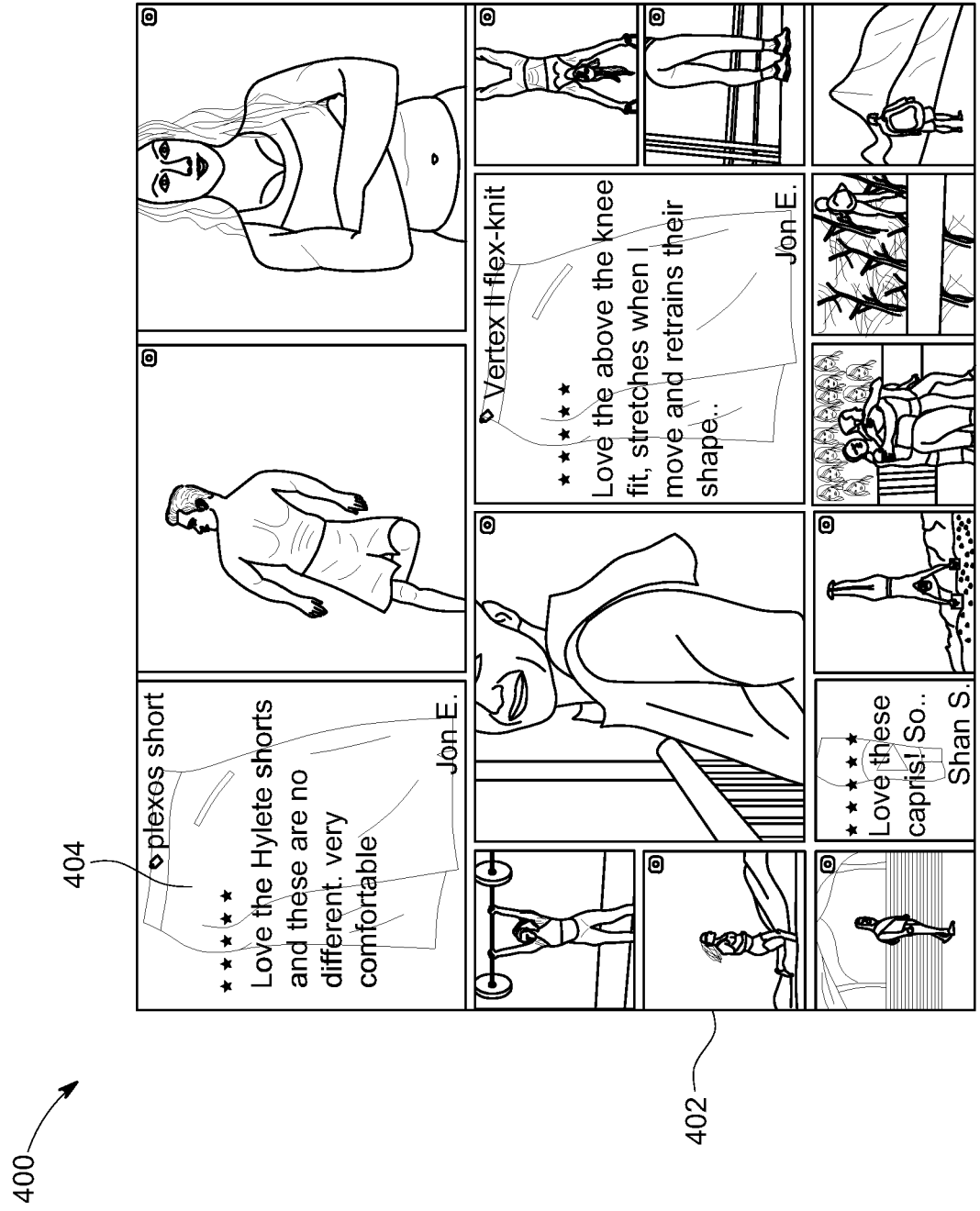

Using the UGC provided by the third party service providers 112, the content management platform 106 may be configured to enable dynamic content provisioning, for UGC, to the users accessing the content management platform 106 through the user device 102, such as illustrated in the methods of FIGS. 3 and 4 as discussed below.

FIG. 3 illustrates an exemplary flow diagram of a method 300 for enabling provision of product recommendations to users, in accordance with an exemplary embodiment of the present invention. The method 300 may include, at 302, receiving review information associated with a plurality of reviews. The plurality of reviews may be associated with a plurality of products. The reviews may be collectively stored by a third party rating and review service provider platform. Such reviews may be gathered from various users and may form part of UGC. In some example embodiments, the review information may be retrieved by a content management platform, such as the content management platform 106. The content management platform may also be configured to store a product catalog containing information about various products of a brand. The information about reviews for each of these products may be maintained by the rating service provider. In some example embodiments, receiving the review information may include using an API integration between the content management platform 106 and the rating service provider for retrieving the review information. In some example embodiments, receiving the review information may include using customized review data feeds for retrieving the review information from the rating service provider.

At step 304, the review information may be matched to each product. This matching may be performed without any user involvement, in an automatic manner. For example, each product may be associated with a unique identifier. Using this unique identifier, a review corresponding to a product may be identified and matched with the product. The product's unique identifier may help to establish a relationship between visual UGC (photos, videos, etc.) with product reviews. This unique identifier may be the pivotal identifier that enables the content management platform 106 to provide textual review features and services. In some example embodiments, the unique identifier may include, but may not be limited to a serial number, an electronic digital format identifier, a barcode, a stock keeping unit (SKU), a QR code, a pattern, a serial number, an image, a digital signature and the like. The unique identifier may enable matching of the reviews with products.

After matching reviews to products in this manner, at 306, review information may filtered or curated, by the client or brand associated with the content management platform. Such review curation may include filtering, sorting and searching for most promising reviews to allow the client to show only specific reviews to the users, in order to enhance their brand value. The curation may be done on the basis of various rating parameters such as star rating of a product, for example, only products with more than 4 stars on a rating scale of 5 stars may be shown to the users. Other rating parameters may be type of products, some manual parameters, product being "favored", not-"favored", and "all". In a similar manner, sorting of the products may also be done on the basis of sorting parameters such as sort by 1) favored/not-favored, 2) product stock keeping units ("SKU"), 3) product name, 4) star ratings, 5) review title, 6) review description, 7) date of review created, and 8) reviewer and search for product name or product SKU.

After curation, at 308, the curated reviews may be published, such as on an album or a gallery section of the website of the client brand. In some example embodiments, the client may be provided with an option to turn ON the publishing of reviews. Along with that, the display of reviews may also be managed using an editor interface, such as managing display color, font, size etc. for the published reviews. Thus, at 310, the reviews may be displayed after managing all the display settings. The display settings may include various display options such as display density, which may define how many reviews will fit in a display area, mixing of the reviews using a randomized algorithm, mixing of text based review data with visual or graphic data, in the form of display tiles. Other display options may be tile opacity, tile size and the like.

Thus, using the method 300 in FIG. 3 UGC may be used for integrating textual and visual product recommendation data such as review tiles, product photos, user photos and the like, in the form of a gallery, as will be illustrated in the display representations illustrated in FIGS. 4-8.

In an example embodiment, an apparatus for performing the method 300 of FIG. 3 above may comprise a processor configured to perform some or each of the operations of the method of FIG. 3 described previously. The processor may, for example, be configured to perform the operations (302-310) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (302-310) may comprise, for example, the processing module 108 which may be implemented as a separate module in system 100 and/or a device or circuit for executing instructions or executing the algorithms for processing information as described above.

FIGS. 4-8 illustrate display representations for providing product recommendations, in accordance with different exemplary embodiments.

FIG. 4 illustrates an exemplary display representation in which visual tiles, such as visual tile 402, and textual tiles containing a product review, such as tile 404 may be displayed together to provide a gallery of product reviews.

Figure 5:
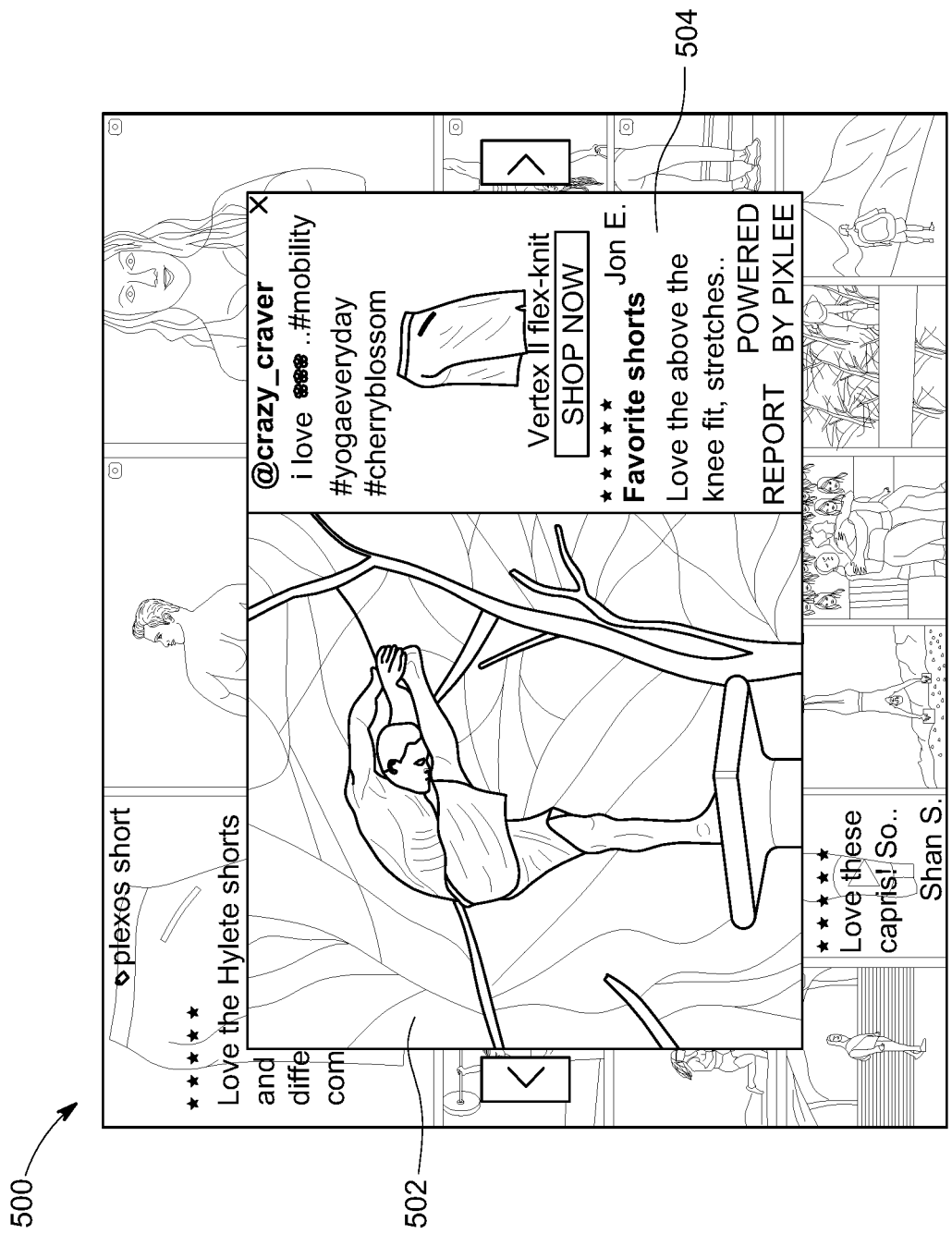
Figure 6:
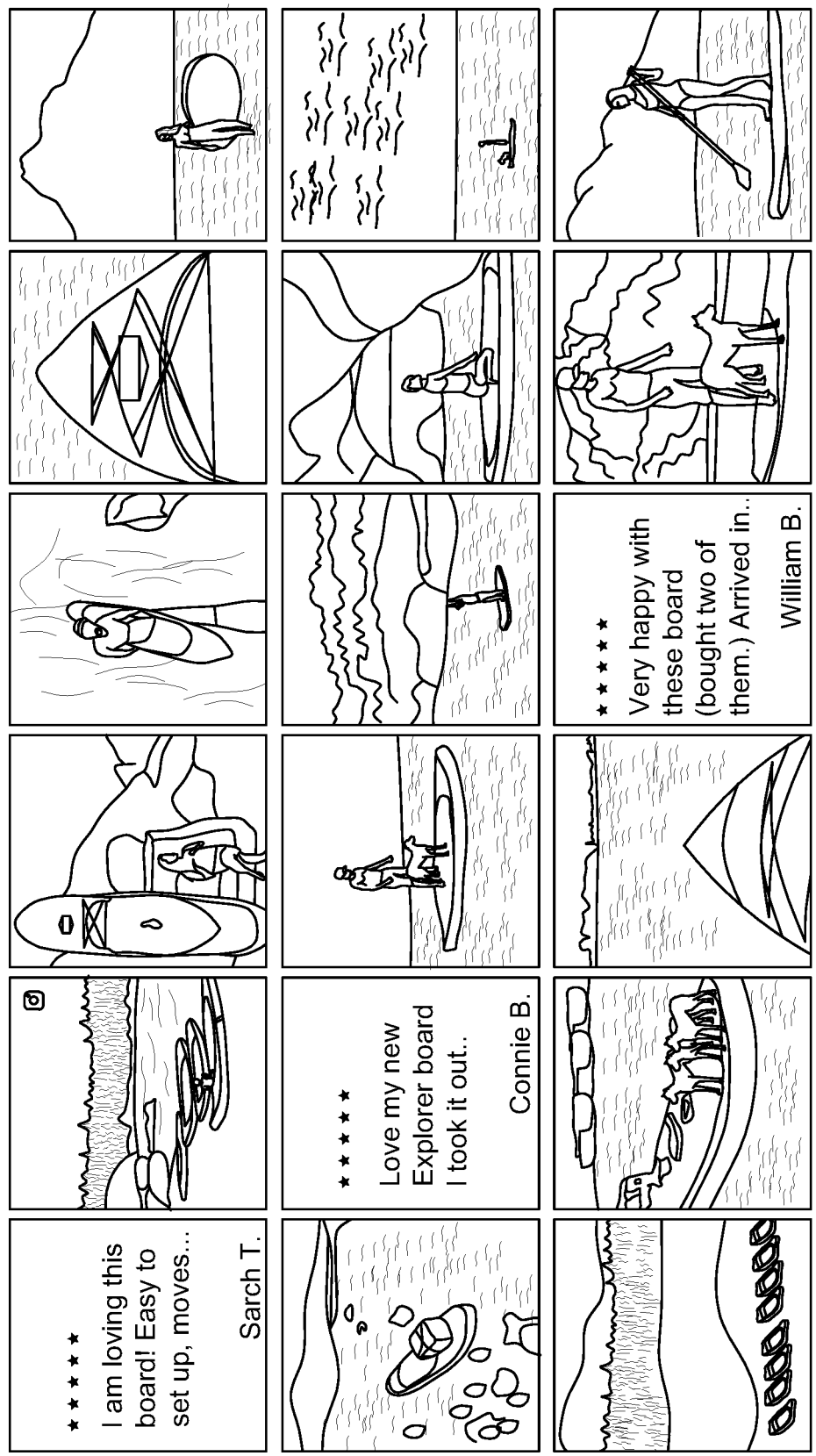
Figure 7:
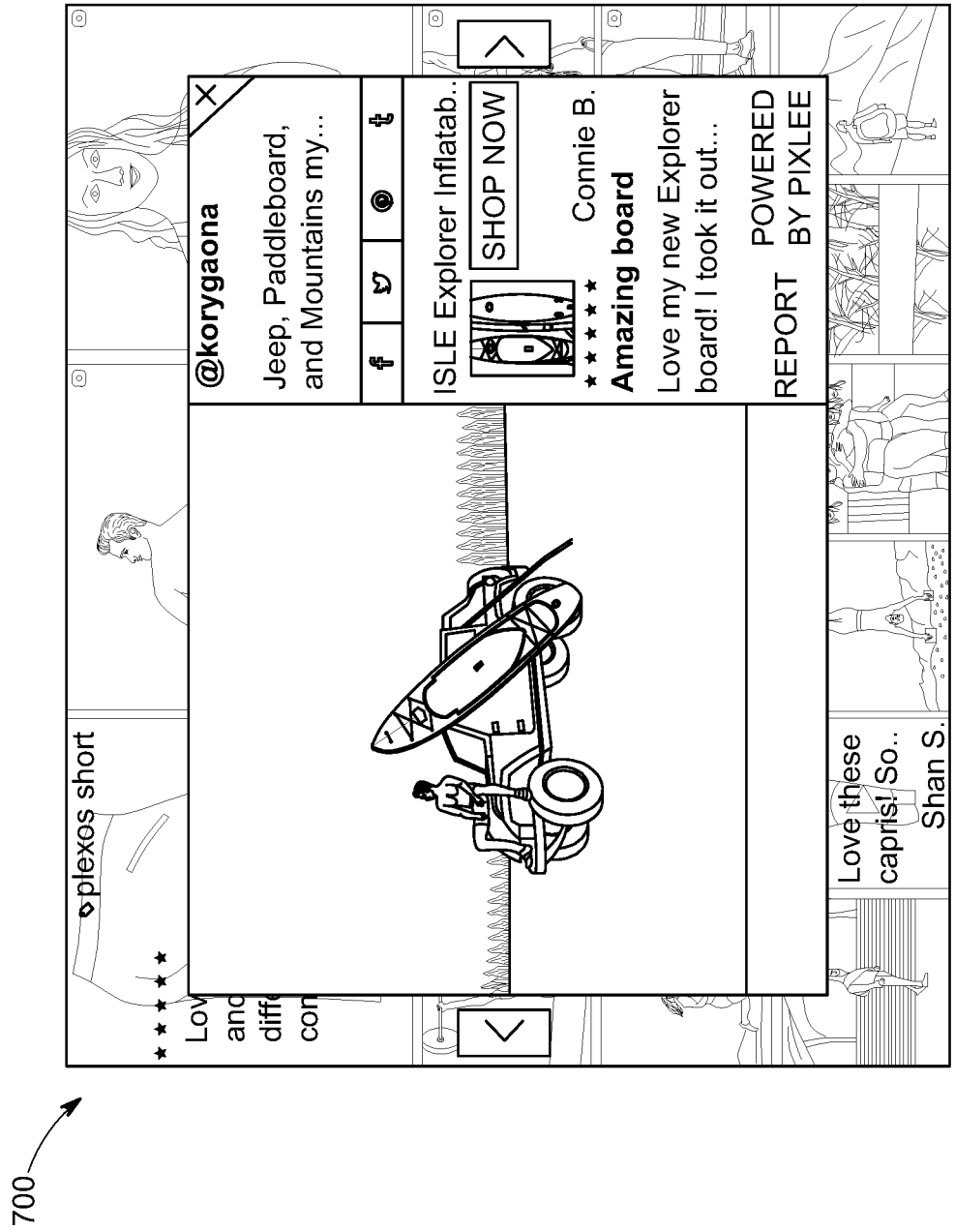

FIG. 5 illustrates another exemplary representational layout for presenting visual tile 502 and text tile 504 for product reviews in a side-by-side manner, thus having a different review density. FIGS. 6 & 7 are other exemplary representations illustrating different embodiments for presenting product reviews.

Figure 8:

FIG. 8 illustrates an interface of a third party service provider for managing integration of visual and textual content for providing product recommendations to users. The interface may provide a client with options to write reviews, manage star ratings of products, and specify filters for review publishing and the like.

In some example embodiments, the user interfaces may allow configuring various parameters related to display of reviews. Such parameters may include such as one or more of a color, a font size, star size, a display density, a display scheme, a display opacity, a display size, and the option to show or hide product review titles for the published review information.

FIGS. 9A-9C illustrate exemplary user interfaces for configuring display options for a review, in accordance with different exemplary embodiments. FIG. 9A illustrates an exemplary user interface that may be used to configure display options such as font, color, header, widget and different parameters for an integrated visual and textual review depicted in the form of image and text tiles in the FIG. 9A. The color configuration may define a standard primary color and a standard secondary color to allow the customers to customize the display. The primary and secondary colors may be used to determine the color of the text in display and the background color in display. Also, in case of a text review, the primary color will be used as the text tile background (transparent or solid), and secondary color will be used for the color of the product review text. For example in FIG. 9A, the text color is yellow and the text tile background color is brown.

Apart from color, other properties of display tile may also be configured, such as depicted in the FIG. 9B, which illustrates properties such as font size, star size, and background image for the review tile, which may be configured using the user interface of FIG. 9B. Even stars depicted in the gallery images in FIGS. 9A-9C may be configured based on their display size. There may also be other configuration options for review tiles showing product images and text arrange in the form of tiles placed side by side. Some of these options are depicted in FIG. 9C and include such as image size, image location, turning display tile review format on and off and the like. In some example embodiments, customers may be able to adjust size of the review text display, impacting display size of the review title, review description, review contributor name, and product name.

In some example embodiments, the configuration options may include adjusting a display scheme for display of reviews, as depicted in FIG. 10.

FIG. 10 illustrates an exemplary user interface for configuring display scheme or layout for a review, in accordance with an exemplary embodiment. The display scheme may include photowall (even-sized tiles), mosaic (un-even size tiles), horizontal carousel (even-sized tiles), vertical carousel (even-sized tiles), coverflow (focus on the center photo), and slideshow.

In some example embodiments, even opacity of tiles may be adjusted. There may be 2 pre-defined opacity options, 100% opacity—customer sees a solid-color tile background, and non-100% opacity—customer sees the product picture behind the transparent tile background color.

In some example embodiments, text review tiles may be placed on large, medium, and small-size tiles, depends on the layout of the gallery. Some exemplary text display configurations may include such as for a desktop browser small tiles to show stars, review description, contributor name etc; medium tiles to show stars, review description, contributor name etc; and large tiles to show stars, review description, contributor name, product name and the like. Similarly, for a mobile web browser, small tiles to show a product photo; medium tiles to show review description and large tiles to show review description. An exemplary mobile browser is depicted in FIG. 11.

FIG. 11 illustrates an exemplary display interface 1100 of a mobile device for providing product recommendations and displaying various review tiles, in accordance with an exemplary embodiment.

In some example embodiments, the customer may even be able to select whether to show the review title or hide it. This option may be available because some reviews do not come with a "subject", aka "title", and some reviews have the same text for both title and description, thus showing both review title and description would be redundant.

The methods and systems set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and sub combinations of the various elements, features, functions, and/or properties disclosed herein. The following claims particularly point out certain combinations and sub combinations regarded as novel and nonobvious. Inventions embodied in other combinations and sub combinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed:

1. An automated, textual-product-review-and-visual-content, electronic system for generating a display representation of published textual-product-review information and visual content, comprising:
    at least one non-transitory memory configured to store computer program code instructions; and
    at least one processor configured to execute the computer program code instructions to:
        receive textual-product-review information in plural product reviews from a product rating service or other textual content from various sources, the textual-product-review information including, for each of the plural product reviews, identifying information for a reviewer who created and contributed the product review;
        receive visual content from user-generated-content images and other images of the product;
        choose at least one piece of textual-product-review information for the product from the textual-product-review information associated with the textual-product-review information;
        request and receive permission from the reviewers to use the product reviews;
        search, filter and sort the product-review information in plural textual product reviews or other textual content based on the choice and one or more rating parameters;
        after doing the search, filter and sort, combine the at least one piece of textual-product-review information for the product with the visual content;
        publish the textual-product-review information combined with the visual content for the product in numerous gallery tile layouts; and
        generate and configure the published textual-product-review information and visual content on an output interface to provide recommendations for the product,
    wherein the configure component adds one or more of a color, a font size, star size, a display density, a display scheme, a display opacity, a display size, and the option to show or hide product review titles for the published product-review information;
    wherein the processor is further configured to automatically match the at least one piece of textual-product-review information for the product from the textual-product-review information;
    wherein the published product reviews comprises text information and graphic information;
    wherein the processor is further configured to associate a catalog of the product with the rating service;
    wherein the one or more rating parameters comprise at least one of a star rating, and a manual rating;
    wherein the graphic information comprises one or more photos associated with the product; and
    wherein the at least one processor is further configured to:
        record, for each published gallery tile comprising combined textual-product-review information and visual content, user engagement events comprising at least one of click-through, dwell time, or share actions;
        update a numerical engagement score for each gallery tile based on the recorded user engagement events; and
        automatically re-order the publication and display of the gallery tiles according to the updated engagement scores, such that tiles with higher engagement scores are presented more prominently in subsequent presentations.

2. A method for automatically, electronically generating textual-product-review-and-visual-content, comprising:
    receiving textual-product-review information in plural product reviews from a product rating service or other textual content from various sources;
    receiving visual content from user-generated-content images and other images of the product, at least one of the user-generated-content images including identifying information for a creator of the at least one user-generated-content image;
    requesting and receiving permission from the creator to use the at least one user-generated-content image;
    choosing at least one piece of textual-product-review information for the product from the textual-product-review information associated with the textual-product-review information;
    searching, filtering, and sorting the product-review information in plural textual product reviews or other textual content based on the choice and one or more rating parameters;
    after matching, combining the at least on piece of textual-product-review information for the product with visual content, including the at least one user-generated-content image for which permission to use has been requested and received;
    after combining, publishing the textual-product-review information combined with the visual content for the product in numerous gallery tile layouts; and
    generating and configuring the published textual-product-review information and visual content on an output interface for providing recommendations for the product, wherein the configuring adds one or more of a color, a font size, star size, a display density, a display scheme, a display opacity, a display size, and the option to show or hide product review titles for the published product-review information;
    further comprising automatically matching the at least one piece of textual-product-review information for the product from the textual-product-review information;
    wherein the published product reviews comprises text information and graphic information;
    further comprising the step of associating a catalog of the product with the rating service;
    wherein the one or more rating parameters comprise at least one of a star rating, a product type and a manual rating;
    wherein the graphic information comprises one or more photos associated with the product; and
    wherein the method further comprises:

recording, for each published gallery tile comprising combined textual-product-review information and visual content, user engagement events comprising at least one of click-through, dwell time, or share actions;

updating a numerical engagement score for each gallery tile based on the recorded user engagement events; and automatically re-ordering the publication and display of the gallery tiles according to the updated engagement scores, such that tiles with higher engagement scores are presented more prominently in subsequent presentations.

3. A computer program product for automatically, electronically generating textual-product-review-and-visual-content to provide recommendations for a product, the computer program product comprising at least one non-transitory computer-readable storage medium having stored thereon computer-executable program code instructions which when executed by a computer, cause the computer to carry out operations for providing recommendations for a product, the operations comprising:

receiving textual-product-review information in plural product reviews from a product rating service or other textual content from various sources, the textual-product-review information including, for each of the plural product reviews, identifying information for a reviewer who created and contributed the product review;

receiving visual content from user-generated-content images and other images of the product, at least one of the user-generated-content images including identifying information for a creator of the at least one user-generated-content image;

requesting and receiving permission from the creator to use the at least one user-generated-content image;

choosing at least one piece of textual-product-review information for the product from the textual-product-review information associated with the textual-product-review information;

requesting and receiving permission from the reviewer to use the product review; search, filter and sort the product-review information in plural textual product reviews or other textual content based on the choice and one or more rating parameters;

after matching, combining the at least on piece of textual-product-review information for the product with visual content, including the at least one user-generated-content image for which permission to use has been requested and received;

after combining, publishing the textual-product-review information combined with the visual content for the product in numerous gallery tile layouts; and generating the published textual-product-review information and visual content on an output interface for providing recommendations for the product, wherein the configuring adds one or more of a color, a font size, star size, a display density, a display scheme, a display opacity, a display size, and the option to show or hide product review titles for the published product-review information;

further comprising computer-executable program code instructions which when executed by the computer, cause the computer to carry out operations for automatically matching the at least one piece of textual-product-review information for the product from the textual-product-review information;

wherein the published product reviews comprises text information and graphic information;

further comprising computer-executable program code instructions which when executed by the computer, cause the computer to carry out operations for providing an association between a catalog of the product and the rating service;

wherein the one or more rating parameters comprise at least one of a star rating, a product type and a manual rating;

wherein the graphic information comprises one or more photos associated with the product; and further comprising computer-executable program code instructions which when executed by the computer, cause the computer to carry out operations for:

recording, for each published gallery tile comprising combined textual-product-review information and visual content, user engagement events comprising at least one of click-through, dwell time, or share actions;

updating a numerical engagement score for each gallery tile based on the recorded user engagement events; and automatically re-ordering the publication and display of the gallery tiles according to the updated engagement scores, such that tiles with higher engagement scores are presented more prominently in subsequent presentations.

4. The system of claim 1 further wherein the at least one processor is configured to execute the computer program code instructions to:

sort the product-review information in the plural textual product reviews based on the identifying information for the reviewers.

5. The system of claim 1, wherein:

each combination of textual-product-review information and visual content is stored as an item within an album data structure;

each item in the album is associated with a digital permission flag indicating whether permission to publish has been granted by the content creator; and the at least one processor is further configured to publish only those items from the album for which the associated permission flag is set to TRUE.

6. The system of claim 1, wherein:

the at least one processor is further configured to automatically select, from a defined set of gallery layout schemes comprising photowall, mosaic, horizontal carousel, vertical carousel, cover-flow, and slideshow, a layout scheme for displaying the combined textual-product-review information and visual content, wherein the selection is performed in real time according to at least one of a detected viewport size or device orientation of the output interface, such that the gallery layout dynamically switches between said schemes when the shopper's device changes between desktop and mobile or when the device orientation changes.

7. The system of claim 1, wherein the at least one processor is further configured to automatically adjust at least one display parameter selected from the group consisting of color, font size, star size, display density, display scheme, display opacity, and display size for the published gallery tiles, based on at least one of: (i) user engagement metrics, (ii) product category, or (iii) time of day.

8. The system of claim 1, wherein the at least one processor is further configured to retrieve textual-product-review information from a third-party rating service using an API key for authentication.

9. The system of claim 1, wherein the at least one processor is further configured to provide an option to show or hide product review titles for the published product-review information, based on user or client selection.

\* \* \* \* \*